(12) United States Patent  
Senaluck et al.

(10) Patent No.: US 8,496,422 B2  
(45) Date of Patent: Jul. 30, 2013

(54) THREADED STUD WITH LOCKING PAWL

(75) Inventors: Peter Senaluck, Los Angeles, CA (US);  
Jamil Snead, San Diego, CA (US);  
Edward Avetisian, Burbank, CA (US)

(73) Assignee: Avibank Manufacturing, Inc., North Hollywood, CA (US)

( * ) Notice: Subject to any disclaimer, the term of this patent is extended or adjusted under 35 U.S.C. 154(b) by 236 days.

(21) Appl. No.: 13/005,290

(22) Filed: Jan. 12, 2011

(65) Prior Publication Data

US 2011/0170986 A1    Jul. 14, 2011

Related U.S. Application Data

(60) Provisional application No. 61/294,420, filed on Jan. 12, 2010.

(51) Int. Cl.  
*F16B 39/04* (2006.01)

(52) U.S. Cl.  
USPC .......................................... 411/318; 411/315

(58) Field of Classification Search  
USPC ................................................ 411/315–318  
See application file for complete search history.

(56) References Cited

U.S. PATENT DOCUMENTS

| 841,025 | A | * | 1/1907 | Sueuer | 411/318 |
| 1,639,211 | A | * | 8/1927 | Campo | 411/318 |
| 3,408,887 | A | * | 11/1968 | Villo | 83/140 |
| 3,592,250 | A | * | 7/1971 | Petroshanoff | 411/320 |
| 3,712,356 | A | * | 1/1973 | Petroshanoff | 411/208 |
| 4,553,890 | A | * | 11/1985 | Gulistan | 411/318 |
| 5,931,621 | A | * | 8/1999 | Griffith et al. | 411/255 |
| 2009/0136294 | A1 | * | 5/2009 | Porter et al. | 403/408.1 |

* cited by examiner

*Primary Examiner* — Gary Estremsky  
(74) *Attorney, Agent, or Firm* — James M. Duncan, Esq.; Klein DeNatale Goldner

(57) ABSTRACT

A threaded fastener-nut combination for attaching two work pieces together has means for preventing the intrusion of the fastener threads into the bores of each work piece, thus preventing damage to the work piece which may result from such intrusion. The stud member has a pawl member which extends radially outward to engage an aperture in the nut member, which locks the nut member to the stud member. The engagement of the nut member to the threaded portion of the stud member produces both audible and tactile feedback to indicate that the fastener is properly placed and engaged. Tactile feedback is returned through the emergence of the pawl through the aperture in the nut, and by the rotation of the entire fastener assembly upon the provision of further tightening effort. Auditory feedback is provided through a "click" or similar sound produced when the pawls engages the aperture of the nut.

8 Claims, 6 Drawing Sheets

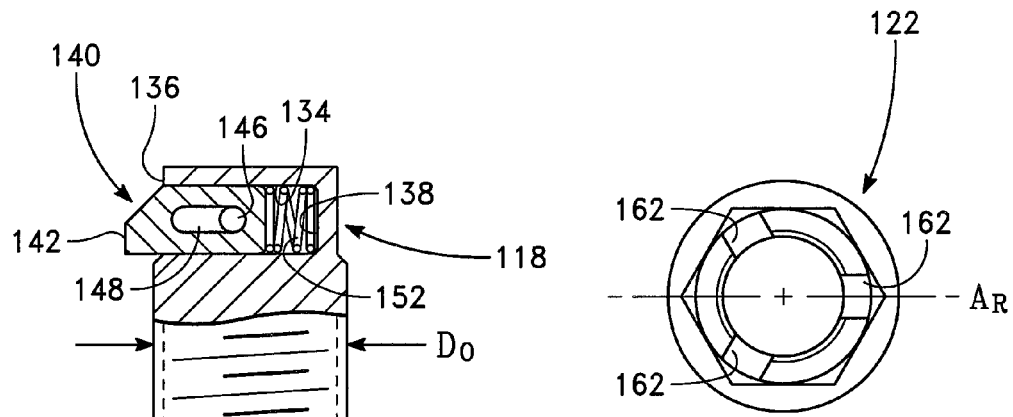
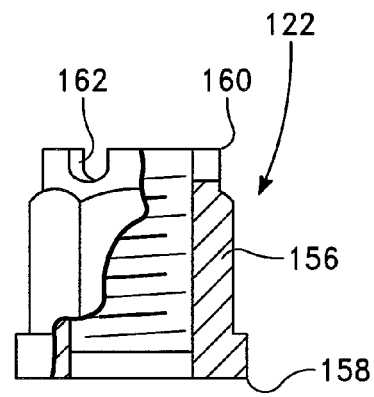
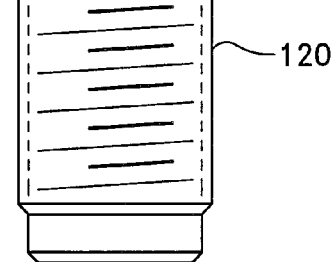
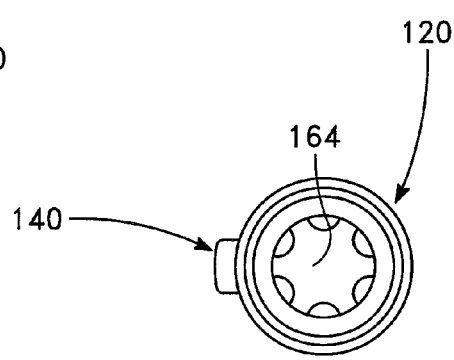
FIG. 9
FIG. 10
FIG. 11
FIG. 12

THREADED STUD WITH LOCKING PAWL

CROSS-REFERENCE TO RELATED APPLICATIONS

U.S. Provisional Application No. 61/294,420 for this invention was filed on Jan. 12, 2010, for which application these inventors claim domestic priority.

BACKGROUND OF THE INVENTION

The disclosed device relates generally to fastening devices, and more particularly to fastening systems for use in the assembly of materials in applications having strict installation requirements, such as aircraft wings. For purposes of this disclosure, fasteners comprise a shank having threaded portions and a grip portion which has no threads. One such fastener has threads on opposite ends, with a grip portion between the threaded ends of the shank. This type of fastener may be utilized to attach two work pieces together, where nuts are made up on each of the threaded ends, as illustrated in FIG. 1. FIG. 1 depicts an idealized installation in which none of the threads of the fastener enter the bores of either work piece. FIG. 2 depicts a realistic installation in which some of the fastener threads enter into the bore of a work piece. The installation depicted in FIG. 2 illustrates the problems which are commonly presented by this type of fastening system. The intrusion of a portion of the threaded section into the bore of the work piece may damage the bore of the work piece by reaming out the bore when the work piece is vibrating.

Another installation problem may be detected by comparing the idealized installation depicted in FIG. 1 with that shown in FIG. 2. FIG. 1 generally shows about the same length of thread above each of the nuts. An idealized installation will have approximately two full threads of the shank extending beyond the top of each nut. If less than two full threads extend beyond the top of a nut, it may not be possible to apply the proper pre-load to the shank, or the nut may not be securely fastened. If excess threads extend beyond the top of the nut, it may also indicate that the threads of nut are entering the transition zone of the fastener shank between the threads and the grip length, where the fastener threads may be incomplete. In addition excess fastener extending past the top of the nut may interfere with the movement of nearby moving structures.

Thus fastening systems utilized for critical service are typically subject to three primary requirements: (1) the fastener threads are not to extend within bore, or grip area, of the work piece—the grip area should only be contacted by the unthreaded portion of the shank section of the fastener; (2) no shanking, whereby the nut cannot run so far down the threads of the fastener that some of the nut threads enters the thread transition zone of the fastener; and (3) there must be sufficient thread protrusion above the top of the nut, whereby a predetermined amount of thread length must protrude completely through the nut to ensure complete nut engagement.

Unfortunately, with the type of fastener system depicted in FIGS. 1-2, it is very difficult to install the system with the required preload, while maintaining the grip length of the fastener within the work piece bores and obtaining the proper thread extension beyond the tops of the nuts. As the fasteners are preloaded to the necessary torque, typically with the shank being retained in a fixed position by a tool either inserted into a broached end or attached to tooling at the end of the shank, it is not uncommon to pull some of the threads of the fastener into the bore. This is particularly true because most applications do no allow the grip length of the fastener to be observed by the installer as the fastener is installed, so the installer is not typically aware that threads are being pulled into the bore of the work piece. Thus an installer is often faced with two competing objectives—obtaining the proper preload while simultaneously trying to prevent fastener threads from entering the work piece bore. However, because the installation tools are usually automated to provide a specified preload and the grip length is not visible to the installer, it is common to simply apply the preload, such that an installation such as that depicted in FIG. 2 is an all too common result.

SUMMARY OF THE INVENTION

The presently disclosed fastening allows for the assembly of materials while complying with the requirements set forth above. The disclosed device meets this requirement through the use of a spring loaded detent pawl that moves perpendicularly to the axis of the stud. Once the set threads are at the correct axial location for proper engagement, the pawl engages a slot or orifice within the encapsulating nut. This engagement provides for correct positioning of the threads relative to the bore of the work piece. Once the pawl has engaged the slot, further applied torque would, but for a backup tool on the opposing end, spin the entire device. Once the pawl has engaged the slot in the encapsulating nut, no further preload is applied to the fastener. The device thereby ensures the meeting of the three requirements of no threads in the work piece bore, no shanking, and sufficient thread protrusion.

The device provides both tactile as well as auditory feed back to indicate that the fastener is properly placed and engaged. Tactile feedback is returned through the emergence of the pawl and the rotation of the entire fastener assembly upon the provision of further tightening effort. Auditory feedback is provided through the "click" or similar sound produced as the retention orifice or slot of the nut is fully engaged by the pawl. The provision of feedback reduces the time necessary for inspections directed towards ensuring the threads are in the proper engagement zone.

The device can also comprise redundancy in the locking mechanism, as multiple pawls within a single stud may be engaged by a plurality of orifices, alternatively a single pawl with two slot engagement surfaces may be used.

The device features the capacity of a manual installation, and thus obviates the need for special tooling for installation. The device is also removable through the use of simple tools, again lessening the capital requirements incurred by a manufacturer.

The studs may be machined from any of the high strength alloys, and may be passivated to provide an acceptable finish.

BRIEF DESCRIPTION OF THE DRAWINGS

FIG. 9 shows a partially sectioned side view of an embodiment of the stud member of the disclosed fastener system, showing a detailed view of an embodiment of the locking pawl.

FIG. 10 shows a top view of an embodiment of a nut which may be utilized with the present invention.

FIG. 11 shows a partially sectioned view of the nut shown in FIG. 10.

FIG. 12 shows an end view of an embodiment of the stud member of the disclosed fastener system, showing a broached opening for attachment of a tool.

DETAILED DESCRIPTION

Figure 1:
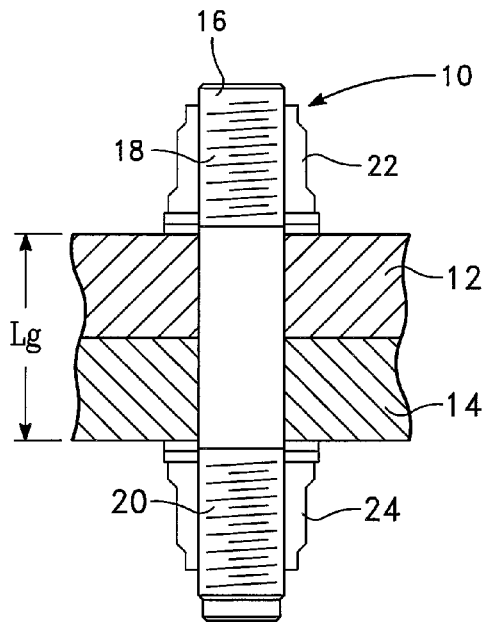
FIG. 1 depicts a sectional view of an idealized fastener installation, in which there is no thread intrusion into the bore of the work piece and the proper number of threads extend beyond the tops of each nut.
Figure 2:
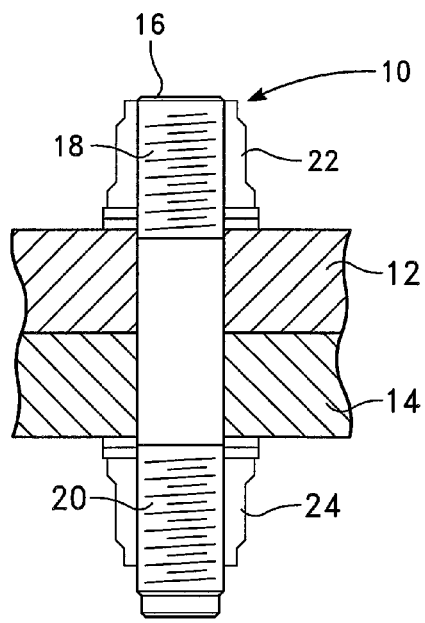
FIG. 2 depicts the fastener system of FIG. 1, but showing how this type of system is frequently installed.

Referring now to the Figures, FIG. 1 depicts an idealized installation of an existing fastening system 10 holding a first work piece 12 to a second work piece 14. The existing fastening system comprises a stud 16 having a first threaded end 18 and a second threaded 20. A grip length $L_g$ is defined between the threads of the first threaded end 18 and the second threaded end 20. A first nut 22 is made up on the first threaded end 18 and a second nut 24 is made up on the second threaded end. FIG. 2 shows the same fastening system 10 as depicted in FIG. 1, but FIG. 2 shows a frequent installation of this type of fastener system, where threads of the stud 16 extend into the bore of the work piece 12. FIG. 2 also shows fewer threads extending above the top of first nut 22, and more threads extending below the top of second nut 24. The installation depicted in FIG. 2 is not desirable, because threads 18 work against the bore of the work piece, causing damage.

Figure 3:
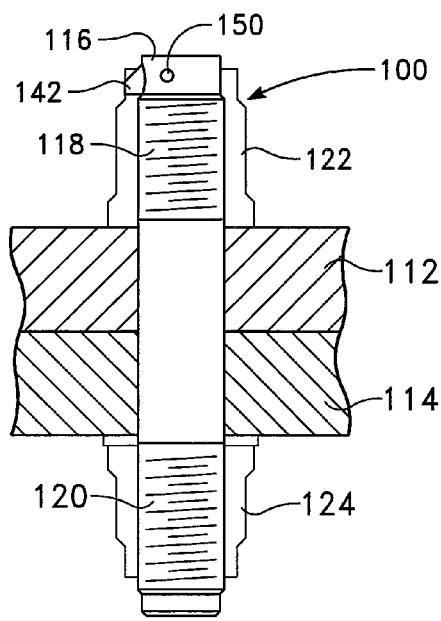
FIG. 3 depicts a sectional view of an embodiment of the presently disclosed fastener system in comparison to that of the prior art fastener systems.

FIG. 3 depicts the same work piece configuration, but shows an embodiment of the disclosed fastener system 100, which prevents the intrusion of the threads of the fastener threads into the bores of the work pieces 112, 114. As shown in greater detail in FIGS. 5-9, the disclosed fastener system 100 comprises a stud member 116 having an outside diameter $D_o$ and a first end 118 and a second end 120. A longitudinal axis $L_A$ is defined by the alignment of first end 118 and second end 120. First end 118 and second end 120 respectively comprise exterior threads 130, 132. Between the exterior threads 130, 132, the stud member 116 comprises grip length $L_G$.

Figure 4:
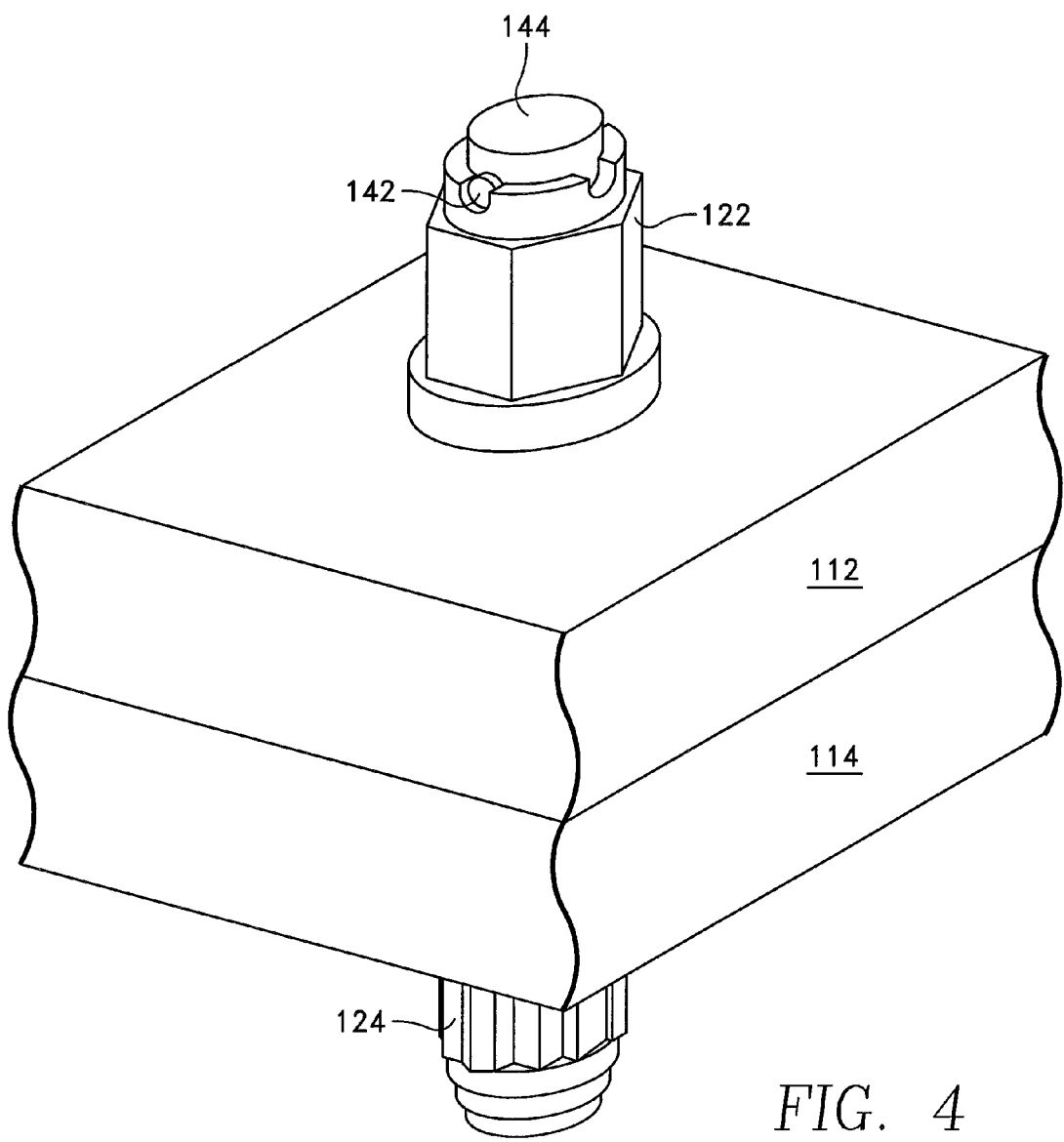
FIG. 4 shows a perspective view of the fastener system depicted in FIG. 3.
Figures 5, 6:
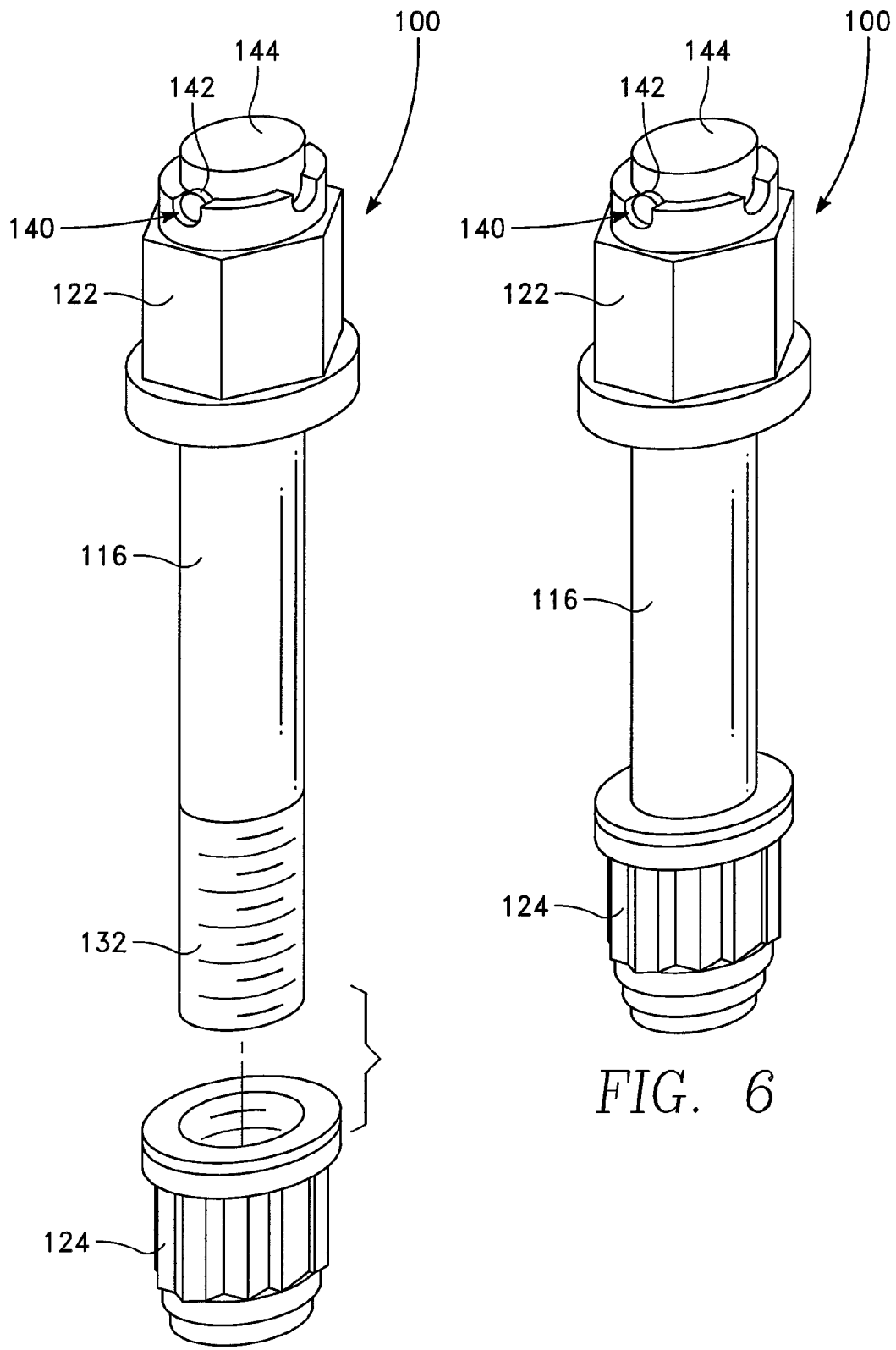
FIGS. 5-6 show a perspective view of embodiments of the stud and nut members of the fastener system depicted in FIG. 4.
Figure 7:
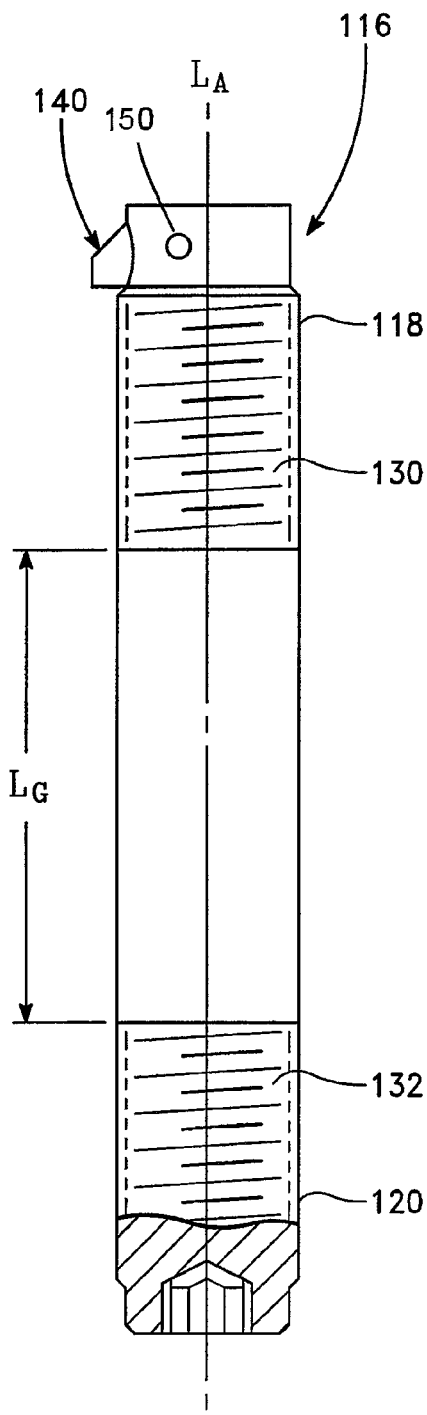
FIG. 7 shows a partially sectioned side view of an embodiment of the stud member of the disclosed fastener system.
Figure 8:
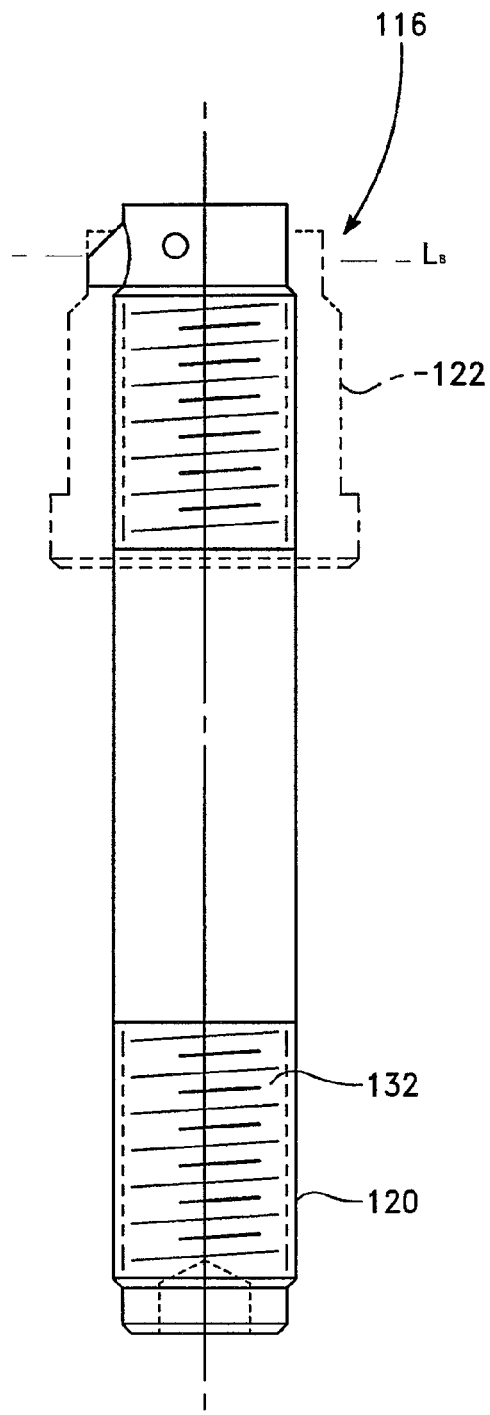
FIG. 8 shows a side view of an embodiment of the stud member of the disclosed fastener system, depicting a nut member installed over a locking pawl.

As best shown in FIG. 9, the first end 118 may have an axial aperture 134 which has an open end 136 and a closed end 138 which are machined into a portion of the first end before the beginning of the exterior threads 130. The axial aperture 134 may have an axis $L_B$ which is normal to the longitudinal axis $L_A$. A pawl member 140 is disposed within the axial aperture 134. The pawl member 140 comprises a tapered first end 142 facing the open end 136 of the axial aperture 134. Pawl member 140 may be depressed such that the entire pawl member is contained within the axial aperture 134, and the tapered first end fully recessed within the axial aperture. This position is referred to herein as the "first position." The figures show the pawl member 140 with the tapered end 142 extending outside of the open end 136 of the axial aperture, where the tapered end extends past the outside diameter $D_o$ of the stud member 116. This position is referred to herein as the "second position." Pawl member 140 may be fabricated from stainless steel or carbon steel materials and heat treated in accord with the required service. As shown in the figures, the tapered first end 142 of the pawl member 140 has an angled end, where the angled end faces towards the unthreaded terminus 144 of first end 118. As shown in FIG. 4, the pawl member 140 may comprise a cylindrical configuration.

Pawl member 140 may be retained within axial aperture 134 by pin 146, which extends through an axial slot 148 in the pawl member. First end 118 may thus comprise a pin hole 150 which extends through the first end. Pin 146 may also comprise stainless steel or carbon steel according to the same specifications as the pawl member 14. A spring 152 may be placed between pawl member 140 and the closed end 138 of the axial aperture, where spring 152 pushes pawl member 140 outwardly such that the tapered first end 142 extends out past the outside diameter $D_o$ of the stud member 116, but where the pawl member is retained within the axial aperture 134 by pin 146. Spring 152 may be fabricated from stainless steel or carbon steel and heat treated according to the requirements of the particular service.

Fastening system 100 further comprises a threaded nut member 122 which mates with the threads 130 of the first end 118 of stud member 116. As shown in FIGS. 10 and 11, the threaded nut member 122 comprises a wall 156, a bottom end 158 and a top end 160. Bottom end 158 is the first portion of the threaded nut member 122 to mate with threads 130 of the first end 118. The top end 160 of the nut member 122 comprises one or more radial slots 162 extending through the wall 156. As shown in FIG. 10, the radial slots 162 have an axis $A_R$ which, when the nut member 122 is installed on the stud member 116, is normal to the longitudinal axis $L_A$. The radial slots 162 are configured to capture the tapered first end 142 of the pawl member 140 when the threaded nut member 122 is sufficiently made up on the threads 130 of the first end 118. At this point, when the appropriate radial slot 162 is adjacent to the tapered first end 142 of the pawl member 140, the pawl member is urged forward by spring 152 until extending to the second position in radial slot 162. Nut member 122 may be fabricated from stainless steel or carbon steel and heat treated according to the requirements of the particular service.

The engagement of the pawl 140 into a radial slot 162 serves to prevent the intrusion of the threaded portion of the stud within the grip area of the assembled materials, preventing the nut member 122 from engaging the transition threads at the thread-shank transition, and ensures adequate thread protrusion. As the nut member 122 is made up on threads 130, both tactile and auditory feed back are provided to indicate that the nut member 122 is properly placed and engaged. If the fastener is properly sized, the proper engagement of nut member 122 will prevent intrusion of any threads into the bores of work pieces 112, 114. Tactile feedback is provided by the emergence of the tapered first end 142 of the pawl member 140, as the nut member 122 is rotated onto threads 130, until the tapered first end completely emerges through one of the radial slots 162, which will prevent any further rotation of nut member 122 if the stud member is prevented from rotation by attachment of a tool to the second end 120 of the stud member 116. Auditory feedback is provided through the "click" or similar sound produced when each radial slot 162 is rotated past pawl member 140, before the radial slot completely engages the tapered first end 142 of the pawl member 140.

FIG. 12 shows a bottom view of second end 120 which shows how the terminus of the second end may be broached to form an opening 164 adapted to receive a drive head, such as a hexalobular driver, as sold under the trademark TORX.

Alternatively, tooling, such as wrench flats or an exterior hex profile, may be placed on the exterior non-threaded portions of the second end 120 to prevent rotation of the stud member 116 as the nut member 122 is made up on threads 130.

Figure 13:
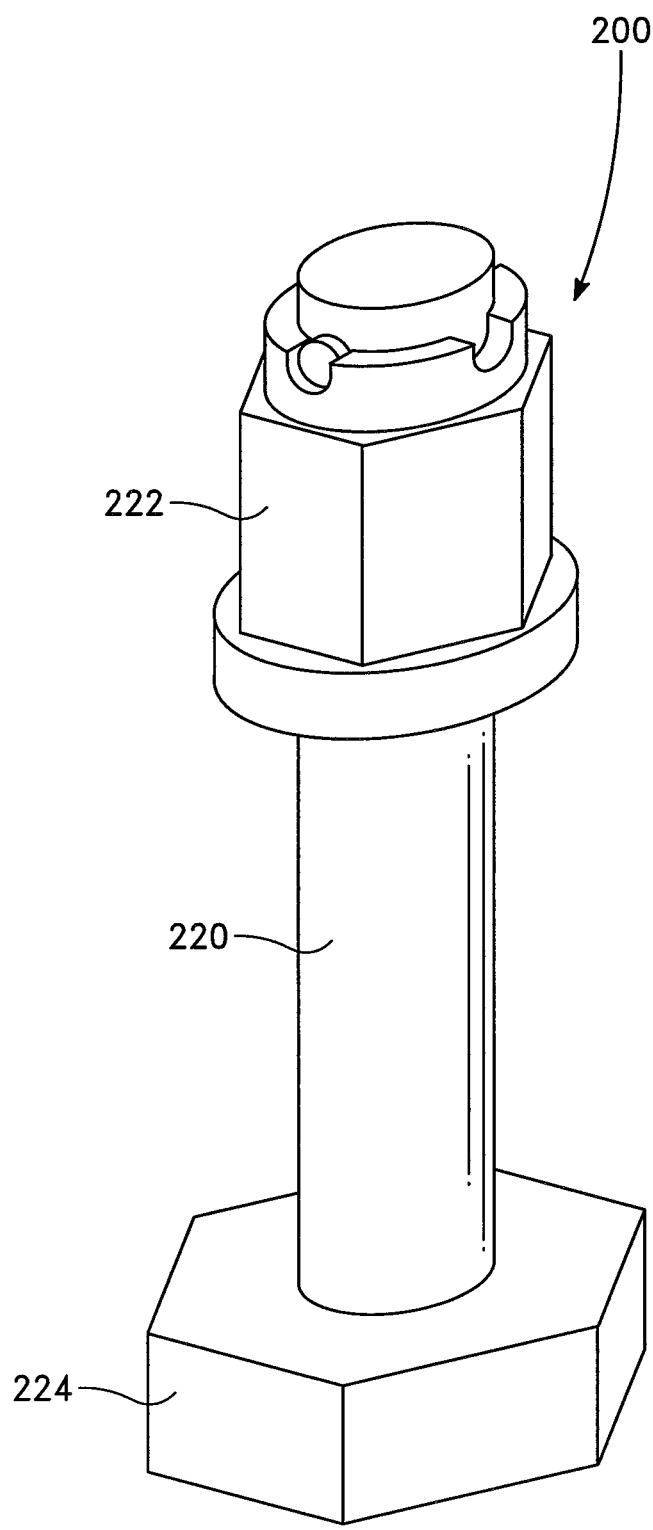
FIG. 13 shows an alternative embodiment of the disclosed fastener system, showing a hex head bolt being utilized as the fastener.

Second end 120 may comprise a standard nut member 124 which is made up on threads 132. Alternatively, another embodiment 200 shown in FIG. 13 would utilize a standard bolt configuration at the second end 220, such as having a hex head 224.

While the above is a description of various embodiments of the present invention, further modifications may be employed without departing from the spirit and scope of the present invention. Thus the scope of the invention should not be limited by the specific structures disclosed. Instead the true scope of the invention should be determined by the following claims.

What is claimed is:

1. A threaded fastener-nut combination for attaching two work pieces together, each work piece having a bore, the fastener-nut combination having means for preventing the intrusion of the fastener threads into the bores of each workpiece, the means for preventing intrusion of the fastener threads into the bores comprising:

a stud member having an outside diameter and a first end and a second end defining a longitudinal axis, the first end and the second end comprising threads, the stud member further comprising a grip length between the first end and the second end;

the first end comprising a pawl member, the pawl member having a tapered end and an opposite facing terminal end, the tapered end and the terminal end defining a long axis of the pawl member wherein the long axis is perpendicular to the longitudinal axis, the pawl member having a first position in which both the tapered end and terminal end are completely enclosed within the first end, and a second position in which the tapered end extends beyond the outside diameter; and an encapsulating nut body having a top, a bottom, and interior threads matching the threads of the first end, the top of the nut body having an aperture for receiving a portion of the tapered end when the nut body is sufficiently rotated onto the threads of the first end such that the aperture is disposed adjacent to the tapered end, wherein receipt of the tapered end into the apertures causes the nut body to be lockingly engaged by the stud member before the threads of the first end enter the bores of the work pieces.

2. The threaded fastener-nut combination of claim 1 wherein the second end comprises a tool attachment means.

3. The threaded fastener-nut combination of claim 2 wherein the tool attachment means comprises a broached opening in the second end for receiving a driver head.

4. The threaded fastener-nut combination of claim 1 comprising a second threaded nut made up on the threads of the second end.

5. The threaded fastener-nut combination of claim 1 wherein the first end comprises an axial aperture having an open end and a closed end, the axis of the axial aperture normal to the longitudinal axis.

6. The threaded fastener-nut combination of claim 5 wherein the pawl member comprises an axially oriented slot extending along a portion of the pawl member.

7. The fastener system of claim 6 wherein the first threaded end comprises a pin hole penetrating through the first threaded end, the pin hole normal to the axial aperture, wherein a pin is disposed in the pin hole, the pin inserted through the axially oriented slot of the pawl member.

8. The fastener system of claim 5 wherein the pawl member is biased in the second position by a spring disposed between the pawl member and the closed end of the axial aperture.

* * * * *